United States Patent [19]

Gensel et al.

[11] Patent Number: 4,936,608

[45] Date of Patent: Jun. 26, 1990

[54] MARKING OF INDUSTRIAL PRODUCTS OR INDIVIDUAL PARTS THEREOF

[75] Inventors: Herbert Gensel; Winfried Michels, both of Sindelfingen; Gerhard Jooss, Ludwigsburg; Peter Mertes, Rottenburg, all of Fed. Rep. of Germany

[73] Assignee: Daimler-Benz AG, Fed. Rep. of Germany

[21] Appl. No.: 233,001

[22] Filed: Aug. 17, 1988

[30] Foreign Application Priority Data

Aug. 27, 1987 [DE] Fed. Rep. of Germany ....... 3728622

[51] Int. Cl.$^5$ .................... B42D 15/00; G09F 3/00; G09F 19/00
[52] U.S. Cl. ........................ 283/70; 283/72; 283/86
[58] Field of Search ............ 283/69, 70, 72, 75, 283/86, 94; 428/29; 156/292

[56] References Cited

U.S. PATENT DOCUMENTS 1,474,706 11/1923 Cardell .................. 283/70
1,992,779 2/1935 Shedd ................... 283/70
4,629,215 12/1986 Maurer et al. .......... 283/72

FOREIGN PATENT DOCUMENTS 2274089 1/1976 France ................... 283/70
2564622 11/1985 France ................... 283/72
2052819 1/1981 United Kingdom ......... 283/70
2092066 8/1982 United Kingdom ......... 283/70
2186236 8/1987 United Kingdom ......... 283/86

Primary Examiner—Douglas D. Watts
Assistant Examiner—Paul M. Heyrana, Sr.
Attorney, Agent, or Firm—Evenson, Wands, Edwards, Lenahan & McKeown

[57] ABSTRACT

The invention relates to marking of industrial products or individual parts thereof by burnt-in alphanumeric symbols and/or company symbols. To be able to apply in a space-saving and cost effective way a machine-readable, informationally identical additional coding, this additional coding is applied, integrated in the symbol, in such a way that distinctly deeper burnt-in locations, which are in themselves machine-detectable, are arranged along the trace of each and every symbol at several predetermined places distributed in a manner individual to the symbol. The deeper burnt-in locations may take the form of a blind hole, for example in the case of cast workpieces, or of a through-hole, for example in the case of sheet metal components. The additional coding can be applied in the same operation as the basic marking without noticeable time loss and without requiring additional space.

19 Claims, 1 Drawing Sheet

MARKING OF INDUSTRIAL PRODUCTS OR INDIVIDUAL PARTS THEREOF

BACKGROUND AND SUMMARY OF THE INVENTION

The invention relates to marking of industrial products or individual parts thereof utilizing a high energy beam to create a predetermine pattern of alphanumeric or other company markings as is usual in part in industrial practice.

The formation or burning-in of symbols can be performed not only by a laser beam but also by a spark-erosive method or by means of a high-pressure water jet. In the case of a water jet, although one would not really say "burning-in", a high-pressure water jet also leaves behind a track on softer materials. A burning-in with laser beam in particular or by means of spark erosion comes into consideration in particular for hard surfaces. However, with a laser beam any type of material can be marked.

In the marking of industrial products, it is often desirable to apply not only an alphanumeric marking but also an informationally similar, readily machine-readable additional coding (cf. for example German Patent Specification 2,616,436). A disadvantage of the dual marking is the relatively large space requirement for the two different types of marking and, in the case of a marking incorporated in the material, the relatively high production effort for the two markings applied next to each other.

An object of the invention is to provide a dual type of informationally similar marking of industrial products which can be produced in a space-saving and cost-effective way.

This object is achieved according to the invention by providing a second pattern of deeper "burnt-in" predetermined patterns in the first "burnt-in" pattern. The additional coding is accommodated in a space-saving way by virtue of a character-integrated application and can, moreover, be produced in the same operation as the marking of the first type by virtue of a greater burnt-in depth. Thanks to the use of high-resolving sensors, the greater burnt-in depth and the distribution of the deeper burnt-in locations can be readily detected and consequently each individual symbol is machine-readable even at the additional coding.

Other objects, advantages and novel features of the present invention will become apparent from the following detailed description of the invention when considered in conjunction with the accompanying drawings.

DETAILED DESCRIPTION OF THE DRAWINGS

Figure 1:
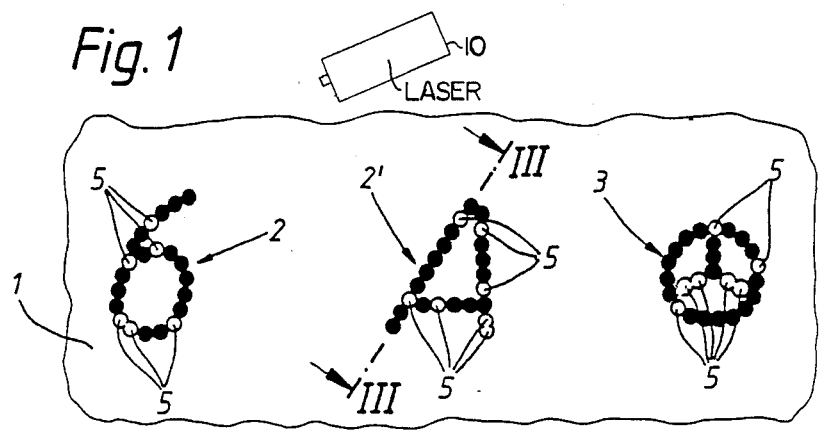
FIG. 1 shows a plan view of a marking of a workpiece, shown in section, with in each case informationally identical machine-readable additional coding, constructed in accordance with a preferred embodiment of the invention.
Figure 2:
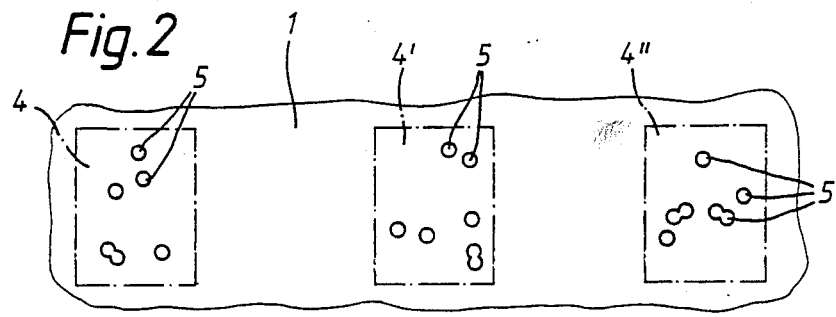
FIG. 2 shows the isolated representation of the additional coding according to the exemplary embodiment of FIG. 1.
Figure 3:
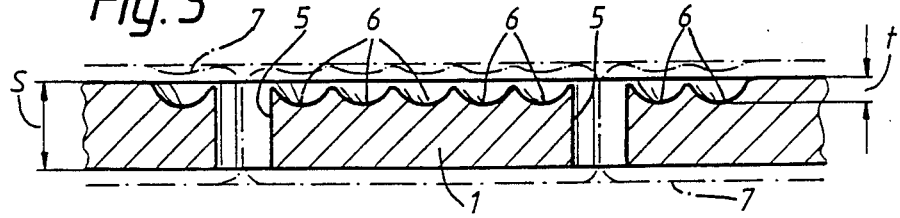
FIG. 3 shows a cross-section through the marking along the section line III—III in FIG. 1.
Figure 4:
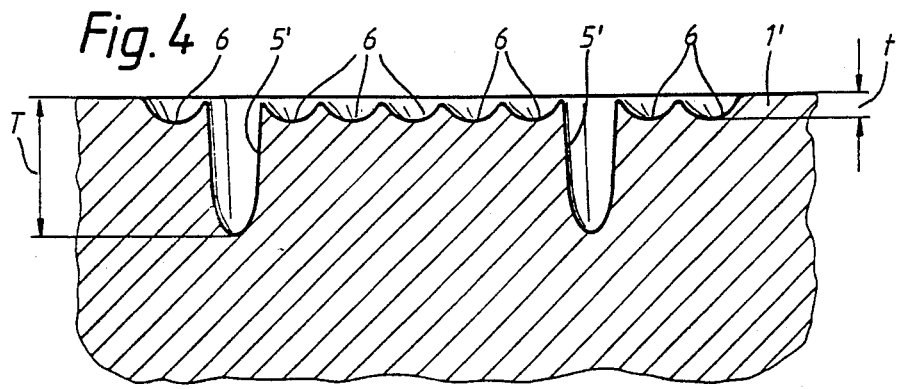
FIG. 4 shows a modification of the invention or of the sectional representation of FIG. 3 for products of greater wall thicknesses.

In FIGS. 1 to 3, the workpiece to be marked, shown merely with a small section taken from its surface, is denoted by 1; the corresponding, thicker-walled workpiece according to FIG. 4 bears the reference numeral 1'. In the case of the exemplary embodiment shown, the marking consists of the two alphanumeric symbols 2 and 2', namely the figure "6" and the capital letter "A" as well as a company symbol 3. The alphanumeric symbols 2, 2' and the company symbol 3 are produced by burning-in of the corresponding trace constituting the symbols into the workpiece surface by means of a laser beam from a laser 10. To be Precise, several individual burnt pits 6 are burnt-in in close succession in the region of the normal burnt track, as the cross-sectional representations of FIGS. 3 and 4 show. To be able to detect the symbols reliably even after coating (coating layer 7) or even after the effect of a certain amount of wear, the normal burnt track is burnt-in at least approximately 0.3 mm deep (dimension t).

To be able to apply in a space-saving and cost-effective way a symbol-integrated, machine-readable additional coding with the visually legible symbols 2, 2' and 3, distinctly deeper burnt-in locations 5 (or 5' in the case of the exemplary embodiment according to FIG. 3) are provided along the trace of each and every symbol. The distribution of the deeper burnt-in locations 5 or 5' is not arbitrary, but distributed along the trace in a manner individual to the symbol in such a way that, during detection by machine of the pattern of holes of the burnt-in locations 5 or 5', a unique assignment between the pattern of holes of the additional coding 4, 4', 4" on the one hand and the visually legible symbols 2, 2' and 3 on the other hand is possible. Each alphanumeric symbol has an individual pattern of holes which can be clearly distinguished from the other symbols and is uniquely machine-detectable. In FIG. 2, the patterns of holes of the deeper burnt-in locations 5 are shown on their own as additional coding 4, 4' and 4", respectively.

In cases in which the workpiece 1 has in the region of the marking only such a wall thickness S which can be penetrated by the laser beam, the deeper burnt-in locations 5 take the form of through holes. In the case of marking thicker-walled workpieces 1', the deeper burnt-in locations 5' take the form of blind holes; the burnt-in depth T of these blind holes being many times greater than the burnt-in depth t in the region of the normal burnt track, so that the deeper burnt-in locations 5' can be uniquely detected by a suitable sensor also when the form of a blind hole is used.

The advantage of the invention is that both the basic marking (symbols 2, 2', 3) and the additional coding 4, 4', 4" can be applied in a space-saving way in one and the same operation. In the case where a deeper burnt-in location 5 or 5' is applied, the energy beam merely stays in the place concerned slightly longer than in the case of burning-in an individual pit 6 within the normal burnt track. However, this slightly longer stay of the energy beam at certain positions of the burnt track is so small that it is completely imperceptible to a person visually observing the inscribing operation. The "time loss" for the additional coding for a single symbol is in the range of milliseconds. Moreover, no additional space at all is required for the additional coding. A further advantage is to be seen in that the inscription with additional coding can also be applied subsequently to coated objects, although the coding is burnt-through at the deep burnt-in locations.

Although the present invention has been described and illustrated in detail, it is to be clearly understood that the same is by way of illustration and example only, and is not to be taken by way of limitation. The spirit and scope of the present invention are to be limited only by the terms of the appended claims.

We claim:

1. Marking arrangement for an article utilizing a series of energy beam generated first and second sets of depressions arranged in a surface of the article to together form a visible symbol:
    wherein said first set of depressions is distributed at specific predetermined locations among the series of depressions forming the visible symbol to form a coded pattern containing decodeable information; and
    wherein said second set of depressions is distinguished from the first set of depressions by having a depth different than a predetermined depth of the first set of depressions.

2. Marking arrangement according to claim 1, wherein the symbol is applied in a region of approximately constant wall thickness of the article able to be penetrated by the type of energy beam used, and wherein the first set of depressions take the form of through-holes.

3. Marking arrangement according to claim 2, wherein the second set of depressions is made at least approximately 0.3 mm deep (dimension t).

4. Marking arrangement according to claim 2, wherein the second set of depressions is formed by a succession of individual burnt pits.

5. Marking arrangement according to claim 1, wherein the second set of depressions is made at least approximately 0.3 mm deep (dimension t).

6. Marking arrangement according to claim 1, wherein the second set of depressions is formed by a succession of individual burnt pits.

7. Marking arrangement according to claim 1, wherein said high energy beam is a laser beam.

8. Marking arrangement according to claim 1, wherein the series of depressions forming a visible symbol is formed by a succession of individual burnt pits.

9. Marking arrangement according to claim 1, wherein the first set of depressions has a predetermined depth greater than the second set of depressions.

10. Marking arrangement according to claim 1, wherein the symbol is at least one of an alphanumeric symbol, a company logo, a series of alphanumeric symbols and a combination of a series of alphanumeric symbols and at least a company logo.

11. Marking arrangement according to claim 1, wherein the first set of depressions is machine detectable.

12. Method of marking industrial products comprising utilizing a high energy beam for burning in of first coded symbols composed each of a plurality of burnt-in locations connected together to form said respective symbols, and simultaneously burning in at least some of said locations to a deeper depth to form a secondary coded symbol, said first and second coded symbols being machine readable separately of one another.

13. Method of marking according to claim 12, wherein the symbols are applied in the region of approximately constant wall thickness(s) of the workpiece able to be penetrated by the type of energy beam used, and wherein the deeper burnt-in locations take the form of through-holes.

14. Method of Marking according to claim 12, wherein the depth of the burnt-in locations of the first coded symbols is at least approximately 3 mm, and wherein the depth of the second coded symbols is at least twice the depth of the first coded symbols.

15. Method of marking according to claim 12, wherein the first and second coded symbols are formed by a laser beam applied by a laser gun, with said second coded symbols formed by retaining the laser gun and beam at a respective location a few milliseconds longer than at location containing only burnt-in sections for the first coded symbol.

16. Method of marking an article comprising the step of:
    generating a series of first and second sets of depressions arranged in a surface of the article utilizing a high energy beam to form a visible symbol, wherein the first set of depressions has a predetermined depth and is distributed at specific predetermined locations among the series of depressions forming the visible symbol to form a coded pattern containing decodeable information; and wherein the a second set of depressions is distinguished from the first set of depressions by having a depth different from the first set of depressions.

17. Method according to claim 16, wherein the first set of depressions has a predetermined depth greater than the second set of depressions.

18. Method according to claim 16, wherein the symbol is at least one of an alphanumeric symbol, a company logo, a series of alphanumeric symbols, and a combination of a series of alphanumeric symbols and at least a company logo.

19. Method according to claim 16, further comprising the step of decoding the coded information of the first set of depressions.

* * * * *